(12) United States Patent
Asano et al.

(10) Patent No.: US 11,984,554 B2
(45) Date of Patent: May 14, 2024

(54) SOLID ELECTROLYTE MATERIAL AND BATTERY INCLUDING THE SAME

(71) Applicant: Panasonic Intellectual Property Management Co., Ltd., Osaka (JP)

(72) Inventors: Tetsuya Asano, Nara (JP); Masashi Sakaida, Hyogo (JP); Akihiro Sakai, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 466 days.

(21) Appl. No.: 17/326,388

(22) Filed: May 21, 2021

(65) Prior Publication Data

US 2021/0328261 A1 Oct. 21, 2021

Related U.S. Application Data

(63) Continuation of application No. PCT/JP2019/042906, filed on Oct. 31, 2019.

(30) Foreign Application Priority Data

Dec. 28, 2018 (JP) .................................. 2018-248583

(51) Int. Cl.
*H01M 10/0562* (2010.01)
*H01M 4/04* (2006.01)
*H01M 4/583* (2010.01)
*H01M 10/0525* (2010.01)

(52) U.S. Cl.
CPC ..... *H01M 10/0562* (2013.01); *H01M 4/0407* (2013.01); *H01M 4/583* (2013.01); *H01M 10/0525* (2013.01); *H01M 2300/008* (2013.01)

(58) Field of Classification Search
None
See application file for complete search history.

(56) References Cited

U.S. PATENT DOCUMENTS

| 6,187,479 B1 | 2/2001 | Liu |
| 2012/0301796 A1 | 11/2012 | Ohtomo et al. |
| 2018/0277890 A1 | 9/2018 | Ueda et al. |
| 2019/0088995 A1 | 3/2019 | Asano et al. |
| 2019/0181443 A1 | 6/2019 | Keuchi et al. |

FOREIGN PATENT DOCUMENTS

| JP | 2011-129312 | 6/2011 |
| JP | 2018-055865 | 4/2018 |

(Continued)

OTHER PUBLICATIONS

International Search Report of PCT application No. PCT/JP2019/042906 dated Dec. 3, 2019.

(Continued)

*Primary Examiner* — Carlos Barcena
(74) *Attorney, Agent, or Firm* — Rimon P.C.

(57) ABSTRACT

A solid electrolyte material of the present disclosure includes a crystal phase represented by $Li_a(Ca_{1-m}M_m)_bX_c$. In the formula, M is at least one element selected from the group consisting of Mg, Sr, and Ba. X is at least one element selected from the group consisting of F, Cl, Br, and I. The following formulas are satisfied: $a>0$, $b>0$, $c>0$, and $0 \leq m < 1$.

19 Claims, 6 Drawing Sheets

(56) References Cited

FOREIGN PATENT DOCUMENTS

WO    2018/025582    2/2018
WO    2018/092359    5/2018

OTHER PUBLICATIONS

The EPC Office Action dated Mar. 9, 2023 for the related European Patent Application No. 19904330.8.
Carl R Schlaikjer et al: "Ionic Conduction in Calcium Doped Polycrystalline Lithium Iodide", Journal of the Electrochemical Society,, vol. 118, No. 9, Sep. 1, 1971 (Sep. 1, 1971), pp. 1447-1450, XP001275560.
The Indian Office Action dated Jan. 11, 2023 for the related Indian Patent Application No. 202147027939.
The Extended European Search Report dated Jan. 25, 2022 for the related European Patent Application No. 19904330.8.
Ravi B G et al: "Preparation and a.c. conductivity studies of $CaF"2$-LiF composites", Materials Science and Engineering: B, Elsevier, Amsterdam, NL, vol. 41, No. 2, Nov. 1, 1996 (Nov. 1, 1996), pp. 241-246, XP004049581 , ISSN: 0921-5107, DOI: 10.1016/S0921-5107(96)01607-8.

SOLID ELECTROLYTE MATERIAL AND BATTERY INCLUDING THE SAME

BACKGROUND

1. Technical Field

The present disclosure relates to a solid electrolyte material and a battery including the solid electrolyte material.

2. Description of the Related Art

WO 2018/025582 discloses a solid electrolyte material represented by composition formula $Li_{6-3z}Y_zX_6$ ($0<z<2$, $X=Cl$ or $Br$). Japanese Unexamined Patent Application Publication No. 2011-129312 discloses an all-solid-state battery including a sulfide solid electrolyte material.

SUMMARY

One non-limiting and exemplary embodiment provides a solid electrolyte material having high reduction resistance.

In one general aspect, the techniques disclosed here feature a solid electrolyte material including a crystal phase represented by composition formula (1) below: $Li_a(Ca_{1-m}M_m)_bX_c$ ... (1), wherein M is at least one element selected from the group consisting of Mg, Sr, and Ba, X is at least one element selected from the group consisting of F, Cl, Br, and I, and the following formulas are satisfied: $a>0$, $b>0$, $c>0$, and $0 \leq m<1$.

The present disclosure provides a solid electrolyte material having high reduction resistance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
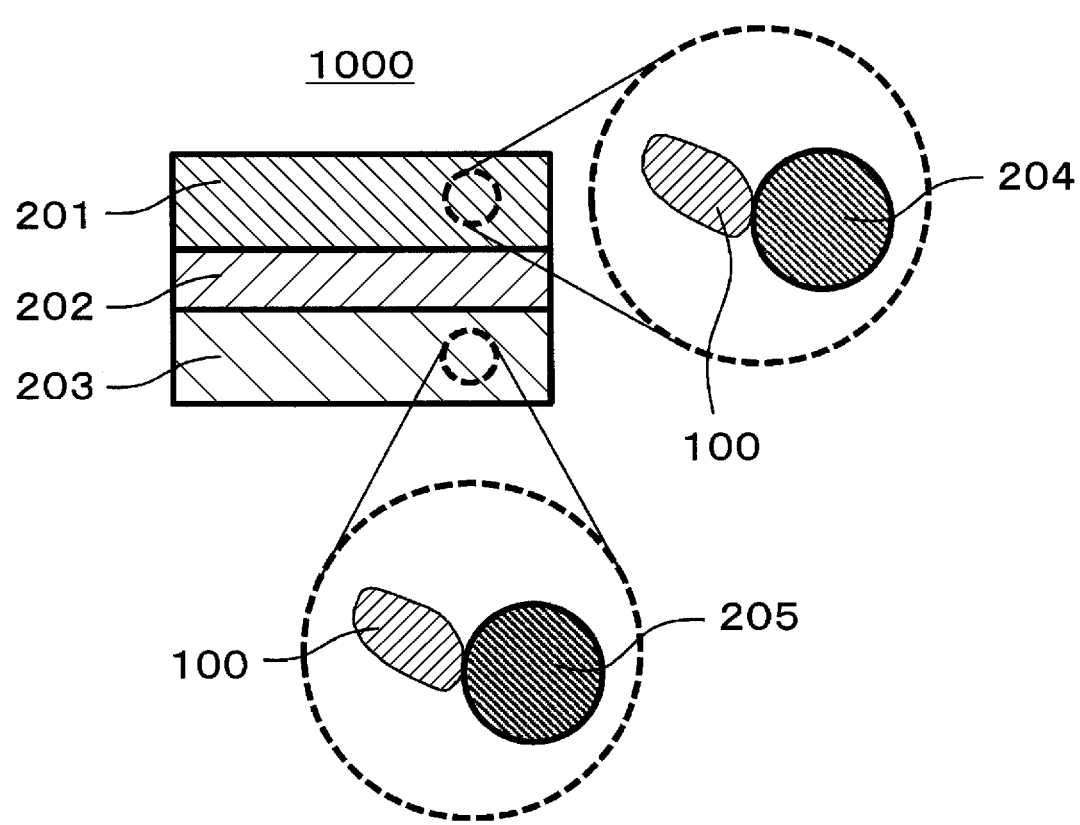
FIG. 1 is a cross-sectional view of a battery 1000 according to a second embodiment.

Embodiments of the present disclosure will be described below with reference to the drawings.

First Embodiment

A solid electrolyte material according to a first embodiment contains a crystal phase represented by composition formula (1) below:

$$Li_a(Ca_{1-m}M_m)_bX_c \qquad (1)$$

wherein M is at least one element selected from the group consisting of Mg, Sr, and Ba, X is at least one element selected from the group consisting of F, Cl, Br, and I, and the following formulas are satisfied:

$a>0$, $b>0$, $c>0$, and $0 \leq m<1$.

The solid electrolyte material according to the first embodiment has high reduction resistance.

Being free of sulfur, the solid electrolyte material according to the first embodiment produces no hydrogen sulfide even under exposure to the atmosphere. As a result, the solid electrolyte material according to the first embodiment has high safety.

The solid electrolyte material according to the first embodiment may be used for providing a battery having good charge/discharge characteristics. Examples of the battery include all-solid-state secondary batteries.

In the X-ray diffraction pattern determined by the θ-2θ method using Cu—Kα radiation (wavelength 0.15405 nm and 0.15444 nm), a peak may be present in each of the range of diffraction angles 2θ greater than or equal to 25° and less than or equal to 29°, the range of diffraction angles 2θ greater than or equal to 29° and less than or equal to 33°, and the range of diffraction angles 2θ greater than or equal to 42° and less than or equal to 48°. The crystal phase having these peaks has high reduction resistance.

In a first conversion pattern obtained by converting the horizontal axis of the X-ray diffraction pattern from diffraction angle 2θ to q, the value of q of a peak present in the range of values of q greater than or equal to 0.176 nm⁻¹ and less than or equal to 0.204 nm⁻¹ is defines as $q_0$. Here, $q=4\pi \sin\theta/\lambda$, and λ represents the wavelength of an X-ray used in the X-ray diffraction analysis. In a second conversion pattern obtained by converting the horizontal axis of the X-ray diffraction pattern from diffraction angle 2θ to $q/q_0$, a peak may be present in each of the range of values of $q/q_0$ greater than or equal to 1.13 and less than or equal to 1.18 and the range of values of $q/q_0$ greater than or equal to 1.60 and less than or equal to 1.66. The crystal phase having these peaks has high reduction resistance. By these conversions, the ratio of interplanar distances between different diffraction planes is extracted from the X-ray diffraction pattern. As a result, variations in peak position due to differences in lattice constant are eliminated, and the characteristics of the same crystal structure are more notably exhibited.

The crystal phase represented by composition formula (1) may have any crystal structure. Examples of the crystal structure include a rock salt structure having a crystal structure belonging to space group Fm-3m. The anion sublattice may have a cubic close-packed structure or a distorted cubic close-packed structure. In the crystal, Li ions, Ca ions, and M ions may randomly occupy equivalent sites or may be regularly arranged. Equivalent sites refer to positions that are defined in the space group and overlapped by symmetry operations.

The solid electrolyte material according to the first embodiment may contain a crystal having a crystal structure different from that of the crystal phase represented by composition formula (1). The solid electrolyte material according to the first embodiment may contain, for example, a crystal phase containing starting materials of the solid electrolyte material, a crystal phase containing by-products generated during synthesis of the solid electrolyte material, or a crystal phase containing decomposition products generated by decomposition of the solid electrolyte material. The solid electrolyte material according to the first embodiment may thus have higher reduction resistance. In other words, the solid electrolyte material may have higher lithium-ion conductivity.

Since the solid electrolyte material has high reduction resistance, the composition formula (1) preferably satisfies c=a+2b.

To increase the reduction resistance of the solid electrolyte material, the following formula may be satisfied: $0.05 \leq a/(a+b) \leq 0.333$.

To increase the reduction resistance of the solid electrolyte material, the following formula may be satisfied: $0 \leq m \leq 0.1$.

The crystal phase represented by composition formula (1) above may be represented by composition formula (2) below.

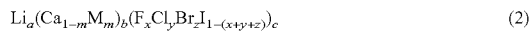

$$Li_a(Ca_{1-m}M_m)_b(F_xCl_yBr_zI_{1-(x+y+z)})_c \qquad (2)$$

wherein the following formula is satisfied: $0.25 \leq 1-(x+y+z) \leq 0.8$.

The solid electrolyte material containing the crystal phase represented by composition formula (2) has high reduction resistance.

The solid electrolyte material according to the first embodiment may have any shape. Examples of the shape include needle shape, spherical shape, and ellipsoid shape. The solid electrolyte material according to the first embodiment may be in the form of particles. The solid electrolyte material according to the first embodiment may be formed so as to have a pellet or plate shape.

When the solid electrolyte material according to the first embodiment has a particle shape (e.g., spherical shape), the solid electrolyte material according to the first embodiment may have a median diameter greater than or equal to 0.1 μm and less than or equal to 100 μm, or may preferably have a median diameter greater than or equal to 0.5 μm and less than or equal to 10 μm. The solid electrolyte material according to the first embodiment thus has higher ion conductivity. Furthermore, the solid electrolyte material according to the first embodiment and other materials may be dispersed well. The median diameter means a particle size at a cumulative volume of 50% in the volume-based particle size distribution. The volume-based particle size distribution may be measured by a laser diffraction-type analyzer or an image analyzer.

To improve the dispersion of the solid electrolyte material according to the first embodiment and active materials, the solid electrolyte material according to the first embodiment has a smaller median diameter than the active materials.

Method for Manufacturing Solid Electrolyte Material

The solid electrolyte material according to the first embodiment may be manufactured by the following method.

Halide material powders are mixed so as to obtain the intended composition.

When the intended composition is, for example, $Li_6CaBr_4I_4$, a LiBr material powder, a LiI material powder, and a $CaBr_2$ material powder are mixed such that the molar ratio of $LiBr:LiI:CaBr_2$ is 2:4:1. Combinations of cations and anions in material powders may be different. For example, a LiBr material powder, a LiI material powder, and a $CaI_2$ material powder may be mixed such that the molar ratio of $LiBr:LiI:CaI_2$ is 4:2:1. Material powders may be mixed at a molar ratio previously adjusted so as to compensate for compositional changes that may occur during the synthesis process.

Material powders are caused to react with each other mechanochemically (i.e., by the mechanochemical milling method) in a mixing device, such as a planetary ball mill, producing a reaction product. The reaction product may be heat-treated in vacuum or in an inert gas atmosphere. Alternatively, a mixture of material powders may be heat-treated in vacuum or in an inert gas atmosphere to produce a reaction product.

The heat treatment may be performed at a temperature greater than or equal to 100° C. and less than or equal to 600° C. The heat treatment may be performed at a temperature greater than or equal to 400° C. and less than or equal to 500° C.

The solid electrolyte material having the composition described above is produced by these methods.

Second Embodiment

A second embodiment will be described below. The matters described in the first embodiment may be appropriately omitted.

A battery according to a second embodiment includes a positive electrode, a negative electrode, and an electrolyte layer. The electrolyte layer is disposed between the positive electrode and the negative electrode. At least one selected from the group consisting of the positive electrode, the electrolyte layer, and the negative electrode contains the solid electrolyte material according to the first embodiment. The battery according to the second embodiment has good charge/discharge characteristics.

FIG. 1 is a cross-sectional view of a battery 1000 according to the second embodiment.

The battery 1000 includes a positive electrode 201, an electrolyte layer 202, and a negative electrode 203. The positive electrode 201 contains positive electrode active material particles 204 and solid electrolyte particles 100. The electrolyte layer 202 is disposed between the positive electrode 201 and the negative electrode 203. The electrolyte layer 202 contains an electrolyte material (e.g., solid electrolyte material). The negative electrode 203 contains negative electrode active material particles 205 and solid electrolyte particles 100.

The solid electrolyte particles 100 are particles containing the solid electrolyte material according to the first embodiment as a main component. The particles containing the solid electrolyte material according to the first embodiment as a main component mean particles containing the solid electrolyte material according to the first embodiment as a component present in the largest quantity. The solid electrolyte particles 100 may be particles composed of the solid electrolyte material according to the first embodiment.

The positive electrode 201 contains a material capable of intercalating and deintercalating metal ions (e.g., lithium ions). The positive electrode 201 contains, for example, a positive electrode active material (e.g., positive electrode active material particles 204).

Examples of the positive electrode active material include lithium-containing transition metal oxides, transition metal fluorides, polyanion materials, fluorinated polyanion materials, transition metal sulfides, transition metal oxyfluorides, transition metal oxysulfides, and transition metal oxynitrides. Examples of lithium-containing transition metal oxides include $LiNi_{1-d-f}Co_dAl_fO_2$ (where 0<d, 0<f, and 0<(d+f)<1) and $LiCoO_2$.

The positive electrode active material particles 204 preferably have a median diameter greater than or equal to 0.1 μm and less than or equal to 100 μm. When the positive electrode active material particles 204 have a median diameter greater than or equal to 0.1 μm, the positive electrode active material particles 204 and the solid electrolyte particles 100 may be dispersed well in the positive electrode. This configuration improves the charge/discharge characteristics of the battery. When the positive electrode active material particles 204 have a median diameter less than or equal to 100 μm, the lithium diffusion rate in the positive electrode active material particles 204 is high. The battery may thus operate with high output.

The positive electrode active material particles 204 may have a larger median diameter than the solid electrolyte particles 100. Thus, the positive electrode active material particles 204 and the solid electrolyte particles 100 may be dispersed well.

From the viewpoint of the energy density and output power of the battery, the ratio of the volume of the positive electrode active material particles 204 to the total volume of the positive electrode active material particles 204 and the solid electrolyte particles 100 in the positive electrode 201 may be greater than or equal to 0.30 and less than or equal to 0.95.

From the viewpoint of the energy density and output power of the battery, the positive electrode 201 may have a thickness greater than or equal to 10 μm and less than or equal to 500 μm.

The electrolyte layer 202 contains an electrolyte material. The electrolyte material is, for example, a solid electrolyte material. In other words, the electrolyte layer 202 may be a solid electrolyte layer.

The electrolyte layer 202 may consist of the solid electrolyte material according to the first embodiment.

The electrolyte layer 202 may consist of a solid electrolyte material different from the solid electrolyte material according to the first embodiment.

Examples of the solid electrolyte material different from the solid electrolyte material according to the first embodiment include $Li_2MgX_4$, $Li_2FeX_4$, Li(Al, Ga, In)$X_4$, $Li_3$(Al, Ga, In)$X_6$, and LiI. In the formulas, X is at least one element selected from the group consisting of F, Cl, Br, and I.

Hereinafter, the solid electrolyte material according to the first embodiment is referred to as a first solid electrolyte material. The solid electrolyte material different from the solid electrolyte material according to the first embodiment is also referred to as a second solid electrolyte material.

The electrolyte layer 202 may contain not only the first solid electrolyte material but also the second solid electrolyte material. In the electrolyte layer 202, the first solid electrolyte material and the second solid electrolyte material may be uniformly dispersed.

A layer composed of the first solid electrolyte material and a layer composed of the second solid electrolyte material may be stacked in the stacking direction of the battery 1000.

The electrolyte layer 202 may have a thickness greater than or equal to 1 μm and less than or equal to 100 μm. When the electrolyte layer 202 has a thickness greater than or equal to 1 μm, short-circuiting is unlikely to occur between the positive electrode 201 and the negative electrode 203. When the electrolyte layer 202 has a thickness less than or equal to 100 μm, the battery may operate with high output power.

The negative electrode 203 contains a material capable of intercalating and deintercalating metal ions (e.g., lithium ions). The negative electrode 203 contains, for example, a negative electrode active material (e.g., negative electrode active material particles 205).

Examples of the negative electrode active material include metal materials, carbon materials, oxides, nitrides, tin compounds, and silicon compounds. The metal materials may be single metals or alloys. Examples of the metal materials include lithium metal and lithium alloys. Examples of the carbon materials include natural graphite, coke, partially graphitized carbon, carbon fiber, spherical carbon, artificial graphite, and amorphous carbon. From the viewpoint of capacity density, suitable examples of the negative electrode active material include silicon (Si), tin (Sn), silicon compounds, and tin compounds. To improve the energy density of the battery, a negative electrode active material having a low average discharge voltage, such as graphite, may be used.

The negative electrode 203 may contain the first solid electrolyte material. Since the first solid electrolyte material has high reduction resistance, the first solid electrolyte material may be used together with a negative electrode active material such as graphite or lithium metal.

The negative electrode active material particles 205 may have a median diameter greater than or equal to 0.1 μm and less than or equal to 100 μm. When the negative electrode active material particles 205 have a median diameter greater than or equal to 0.1, the negative electrode active material particles 205 and the solid electrolyte particles 100 may be dispersed well in the negative electrode. This configuration improves the charge/discharge characteristics of the battery. When the negative electrode active material particles 205 have a median diameter less than or equal to 100 μm, the lithium diffusion rate in the negative electrode active material particles 205 is high. The battery may thus operate with high output.

The negative electrode active material particles 205 may have a larger median diameter than the solid electrolyte particles 100. Thus, the negative electrode active material particles 205 and the solid electrolyte particles 100 may be dispersed well.

From the viewpoint of the energy density and output power of the battery, the ratio of the volume of the negative electrode active material particles 205 to the total volume of the negative electrode active material particles 205 and the solid electrolyte particles 100 in the negative electrode 203 may be greater than or equal to 0.30 and less than or equal to 0.95.

From the viewpoint of the energy density and output power of the battery, the negative electrode 203 may have a thickness greater than or equal to 10 μm and less than or equal to 500 μm.

To increase the ion conductivity, chemical stability, and electrochemical stability, at least one selected from the group consisting of the positive electrode 201, the electrolyte layer 202, and the negative electrode 203 may contain the second solid electrolyte material.

The second solid electrolyte material may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte include
(i) NASICON solid electrolytes, such as $LiTi_2(PO_4)_3$ and element-substituted products thereof,
(ii) $(LaLi)TiO_3$-based perovskite solid electrolytes,
(iii) LISICON solid electrolytes, such as $Li_{14}ZnGe_4O_{16}$, $Li_4SiO_4$, $LiGeO_4$, and element-substituted products thereof,
(iv) garnet solid electrolytes, such as $Li_7La_3Zr_2O_{12}$ and element-substituted products thereof, and
(v) $Li_3PO_4$ and N-substituted products thereof.

The second solid electrolyte material may be a halide solid electrolyte.

Examples of the halide solid electrolyte include $Li_2MgX_4$, $Li_2FeX_4$, $Li(Al, Ga, In)X_4$, $Li_3(Al, Ga, In)X_6$, and LiI. In the formulas, X is at least one element selected from the group consisting of F, Cl, Br, and I.

Other examples of the halide solid electrolyte include compounds represented by $Li_pMe_qY_rX_6$. Here, the following formulas are satisfied: $p+m'q+3r=6$ and $r>0$. Me is at least one element selected from the group consisting of metal elements other than Li and Y and metalloid elements. m' represents the valence of Me. The "metalloid elements" refer to B, Si, Ge, As, Sb, and Te. The "metal elements" refer to all elements (except hydrogen) included in group 1 elements to group 12 elements in the periodic table and all elements (except B, Si, Ge, As, Sb, Te, C, N, P, O, S, and Se) included in group 13 elements to group 16 elements in the periodic table. In other words, the "metal elements" are a group of elements that may become cations when they combine with halogen compounds to form inorganic compounds.

Me may be at least one selected from the group consisting of Mg, Ca, Sr, Ba, Zn, Sc, Al, Ga, Bi, Zr, Hf, Ti, Sn, Ta, and Nb.

The second solid electrolyte material may be an organic polymer solid electrolyte.

Examples of the organic polymer solid electrolyte include compounds formed from a polymer compound and a lithium salt. The polymer compound may have an ethylene oxide structure. The polymer compound having an ethylene oxide structure can contain more lithium salt and thus can further improve the ion conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate exchange of lithium ions and improve the output characteristics of the battery 1000, at least one selected from the group consisting of the positive electrode 201, the electrolyte layer 202, and the negative electrode 203 may contain a non-aqueous electrolyte solution, a gel electrolyte, or an ionic liquid.

The non-aqueous electrolyte solution contains a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, methyl fluoropropionate, fluorobenzene, fluoroethyl methyl carbonate, and fluorodimethylene carbonate. One non-aqueous solvent selected from these may be used alone. Alternatively, a mixture of two or more non-aqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used. The concentration of the lithium salt is, for example, greater than or equal to 0.5 mol/liter and less than or equal to 2 mol/liter.

The gel electrolyte may be a polymer material impregnated with a non-aqueous electrolyte solution. Examples of the polymer material include polyethylene oxide, polyacrylonitrile, polyvinylidene fluoride, polymethyl methacrylate, and a polymer having an ethylene oxide bond.

Examples of the cation contained in the ionic liquid include
(i) chain aliphatic quaternary salts, such as tetraalkylammonium and tetraalkylphosphonium,
(ii) alicyclic ammoniums, such as pyrrolidiniums, morpholiniums, imidazoliniums, tetrahydropyrimidiniums, piperaziniums, and piperidiniums, and
(iii) nitrogen-containing heterocyclic aromatic cations, such as pyridiniums and imidazoliums.

Examples of the anion contained in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

To improve the adhesion between particles, at least one selected from the group consisting of the positive electrode 201, the electrolyte layer 202, and the negative electrode 203 may contain a binder. Examples of the binder include polyvinylidene fluoride, polytetrafluoroethylene, polyethylene, polypropylene, aramid resin, polyimide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. Copolymers may also be used as a binder. Examples of such a binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may be used as a binder.

To increase the electronic conductivity, at least one selected from the positive electrode 201 and the negative electrode 203 may contain a conductive assistant.

Examples of the conductive assistant include
(i) graphites, such as natural graphite and artificial graphite,
(ii) carbon blacks, such as acetylene black and Ketjenblack,
(iii) conductive fibers, such as carbon fibers and metal fibers,
(iv) fluorinated carbon,
(v) metal powders, such as aluminum powder,
(vi) conductive whiskers, such as zinc oxide whisker and potassium titanate whisker,
(vii) conductive metal oxides, such as titanium oxide, and
(viii) conductive polymer compounds, such as polyaniline, polypyrrole, and polythiophene. To reduce the cost, the conductive assistant (i) or (ii) may be used.

Examples of the shape of the battery according to the second embodiment include coin shape, cylindrical shape, prismatic shape, sheet shape, button shape, flat shape, and stack shape.

EXAMPLES

The present disclosure will be described in more detail with reference to Examples below.

Example 1

Production of Solid Electrolyte Material

In an argon atmosphere having a dew point lower than or equal to −60° C. (hereinafter referred to as a "dry argon atmosphere"), LiBr, LiI, and $CaBr_2$ were prepared as material powders such that the molar ratio of LiBr:LiI:$CaBr_2$ was 2:4:1. These material powders were ground and mixed in a mortar. The resulting mixed powder was milled in a planetary ball mill at 600 rpm for 12 hours to cause mechanochemical reactions. Next, the reaction product was heat-treated in a dry argon atmosphere in a heat treatment furnace at 500° C. for one hour. A powder of a solid electrolyte material according to Example 1 was produced accordingly. The solid electrolyte material according to Example 1 had a composition represented by $Li_6CaBr_4I_4$.

Analysis of Crystal Structure

The X-ray diffraction pattern of the solid electrolyte material according to Example 1 was measured in a dry atmosphere having a dew point lower than or equal to −45° C. by using an X-ray diffractometer (MiniFlex600 available from Rigaku Corporation). As an X-ray source, Cu—Kα radiation was used.

Figure 2:
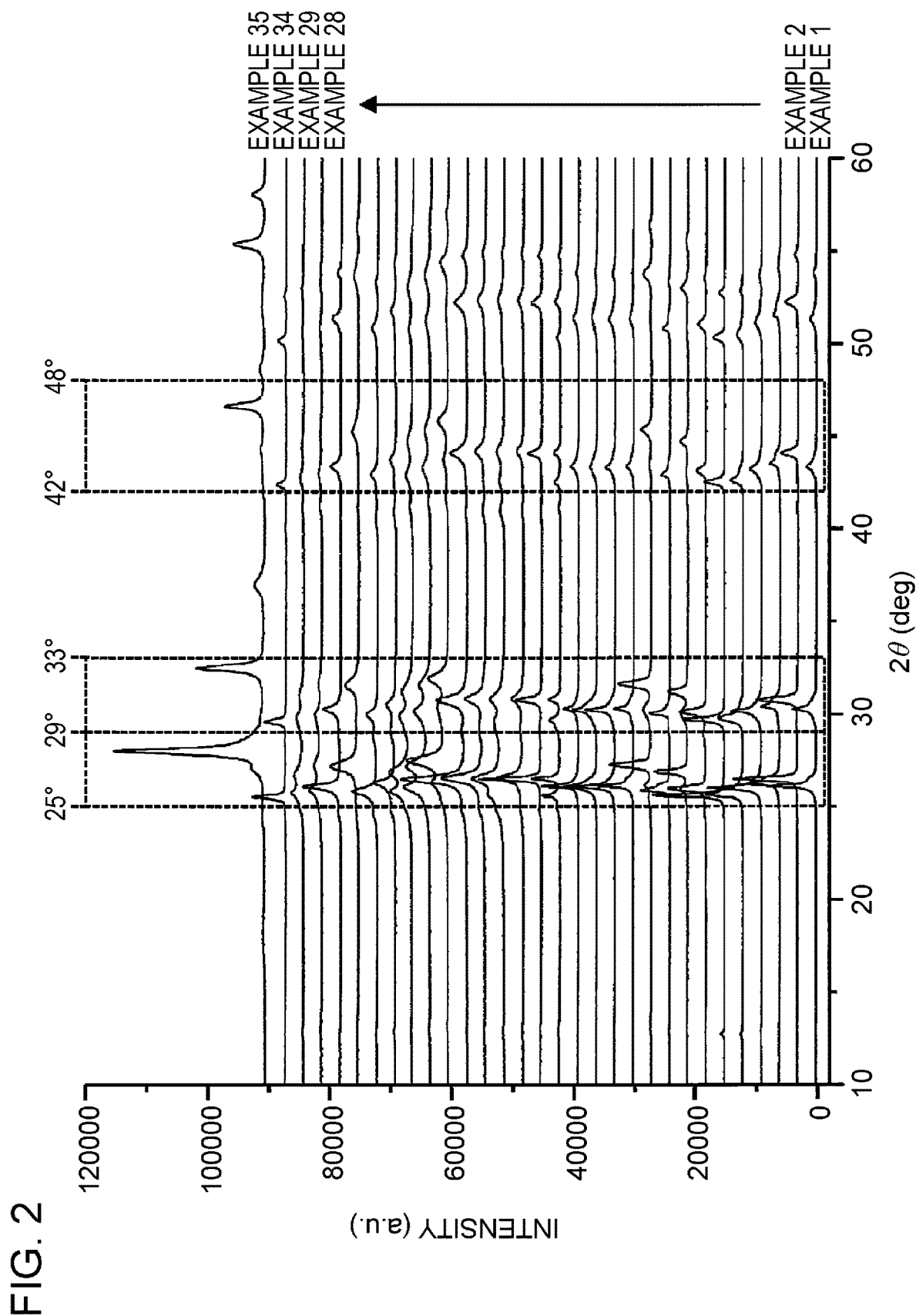
FIG. 2 is a graph showing the X-ray diffraction patterns of solid electrolyte materials according to Examples 1 to 29, 34 and 35 determined by X-ray diffraction analysis using Cu—Kα radiation.

FIG. 2 is a graph showing the X-ray diffraction pattern of the solid electrolyte material according to Example 1.

In the X-ray diffraction pattern of the solid electrolyte material according to Example 1, peaks were present at diffraction angles 2θ of 26.12°, 30.26°, 43.32°, 51.36°, and 53.74°.

These peak angles substantially coincide with some of peak positions observed in the X-ray diffraction pattern of a rock salt structure having a crystal structure belonging to space group Fm-3m and a lattice constant a of 0.590 nm.

Figure 3:
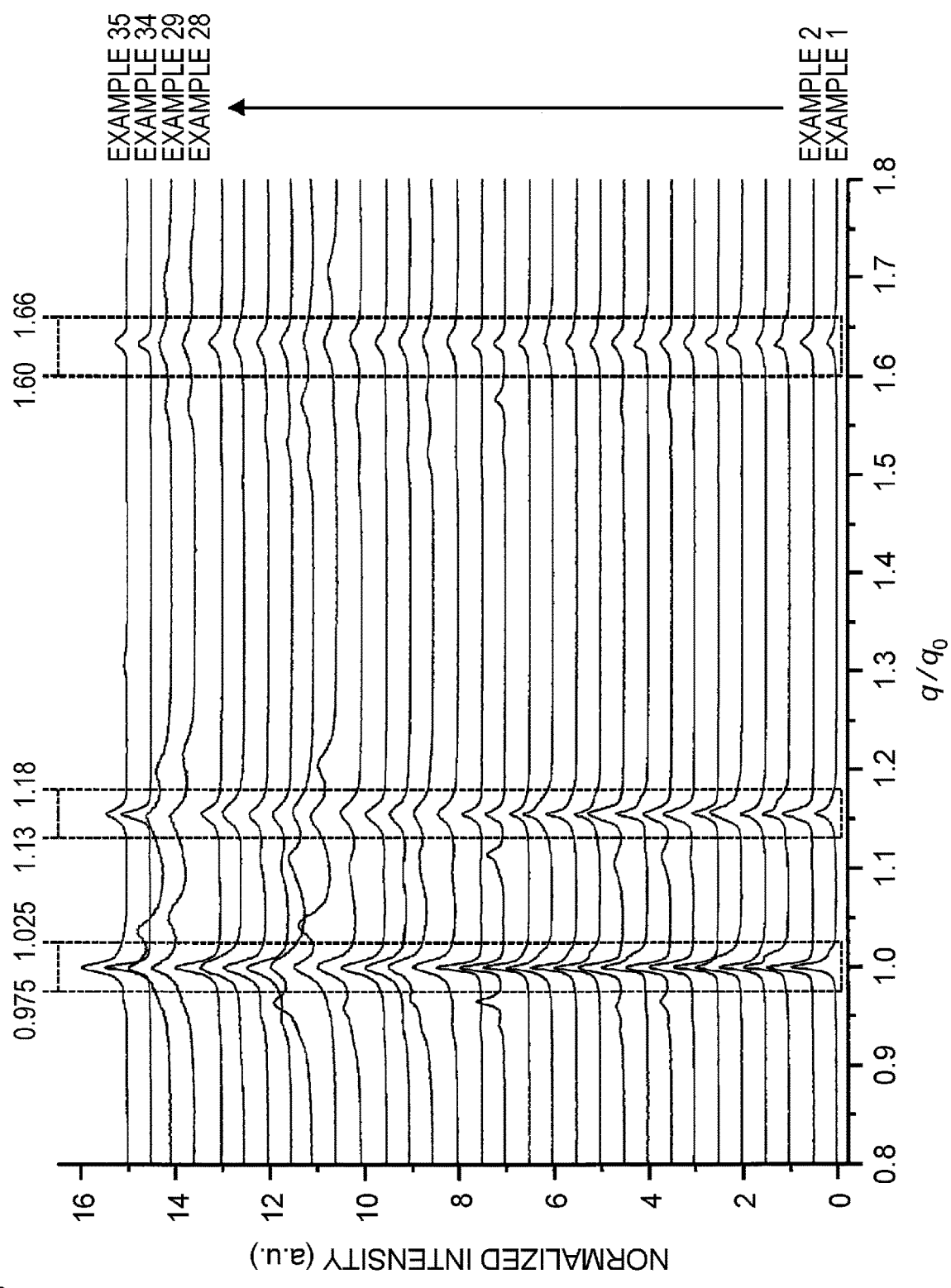
FIG. 3 is a graph where the horizontal axis represents $q/q_0$ converted from 2θ in the graph of FIG. 2.

FIG. 3 is a graph where the horizontal axis represents $q/q_0$ converted from diffraction angle 2θ in the X-ray diffraction pattern of FIG. 2. In other words, FIG. 3 is a graph showing the second conversion pattern. The peak at a diffraction angle 2θ of 26.12° in the X-ray diffraction pattern of the solid electrolyte material according to Example 1 is a peak corresponding to $q_0$ in the first conversion pattern. In the second conversion pattern of the solid electrolyte material according to Example 1, peaks were present at $q/q_0$ of 1.00, 1.155, 1.633, and 1.918.

Evaluation of Reduction Resistance

Figure 4:
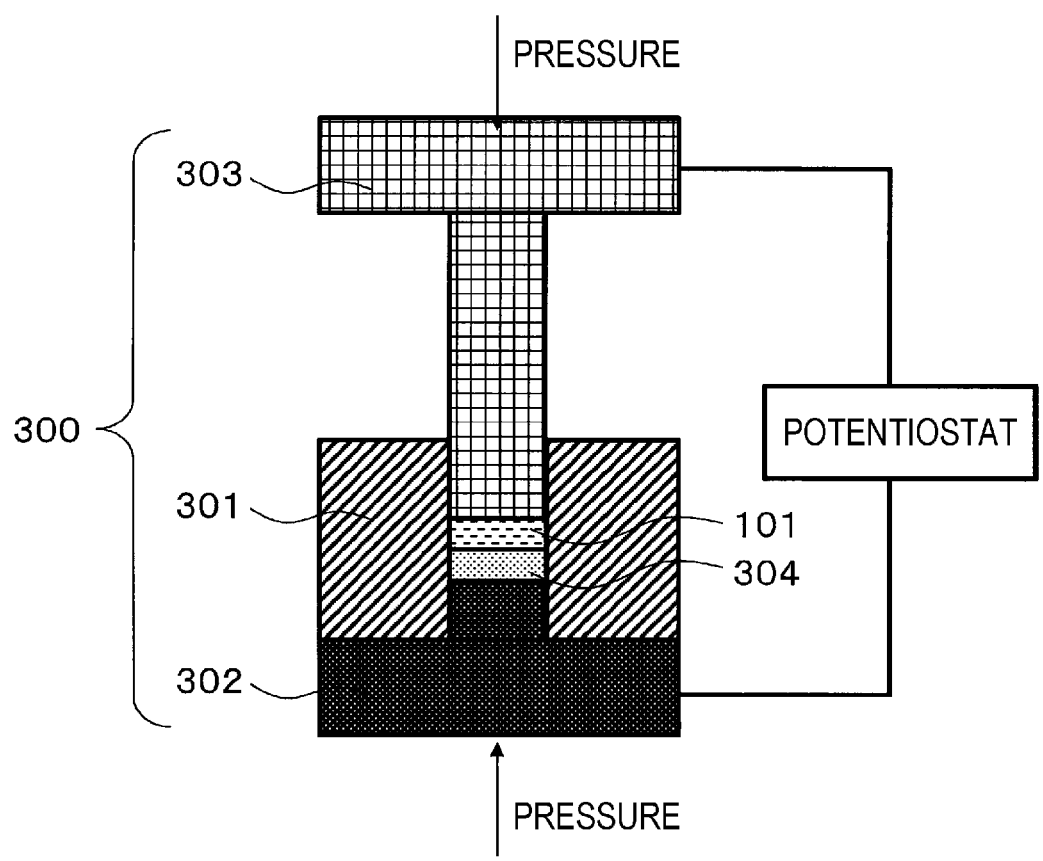
FIG. 4 is a schematic view of a pressure molding die 300 used to evaluate the reduction resistance of a solid electrolyte material.

FIG. 4 is a schematic view of a pressure molding die 300 used to evaluate the reduction resistance of the solid electrolyte material. The pressure molding die 300 included a die 301, a punch lower part 302, and a punch upper part 303. The die 301 was formed of insulating polycarbonate. The punch upper part 303 and the punch lower part 302 were both formed of stainless steel having electronic conductivity.

The reduction resistance of the solid electrolyte material according to Example 1 was measured by the following method using the pressure molding die 300 shown in FIG. 4.

In an argon atmosphere having a dew point lower than or equal to −30° C., a powder of the solid electrolyte material according to Example 1 (a powder 101 of the solid electrolyte material in FIG. 4) was charged into the pressure molding die 300.

In the pressure molding die 300, a pressure of 400 MPa was applied to the powder of the solid electrolyte material according to Example 1 by using the punch upper part 303. Next, a Li metal foil 304 was disposed between the punch lower part 302 and the powder of the solid electrolyte material according to Example 1. A pressure of 40 MPa was applied to the resulting multilayer body.

With the pressure applied, the punch lower part 302 and the punch upper part 303 were connected to a potentiostat (VSP-300 available from Biologic). The punch upper part 303 was connected to a working electrode and a potential measuring terminal. The punch lower part 302 was connected to a counter electrode and a reference electrode.

Figure 5:
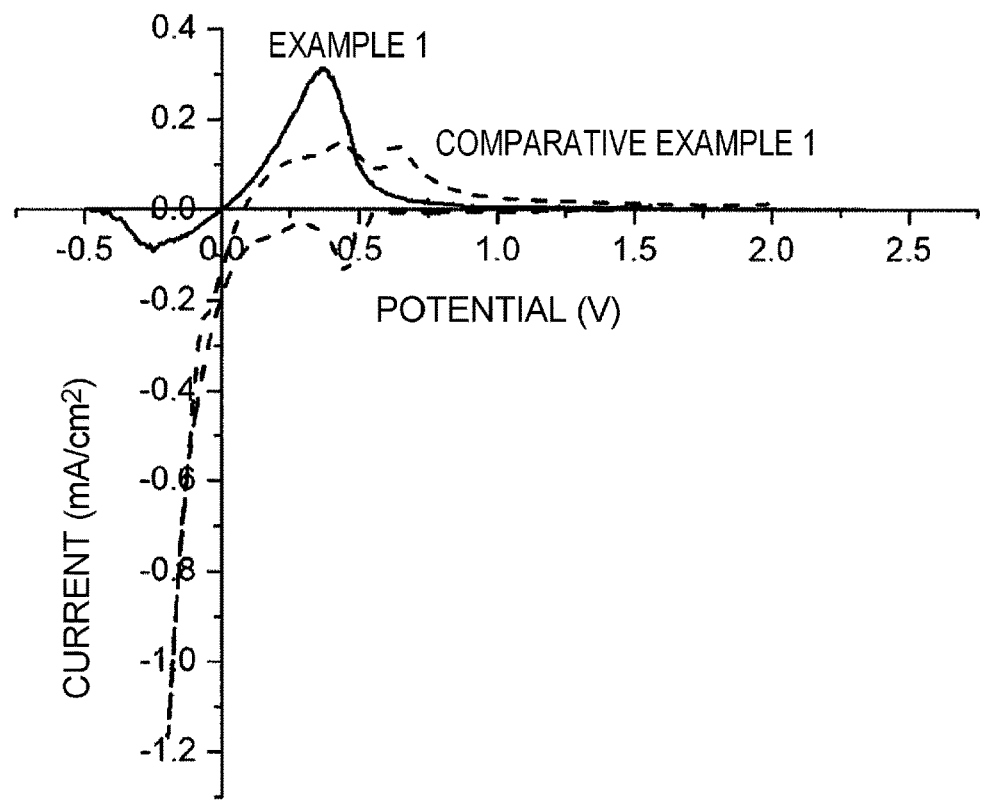
FIG. 5 is a graph showing cyclic voltammetry results of solid electrolyte materials according to Example 1 and Comparative Example 1.

The reduction resistance of the solid electrolyte material was evaluated by cyclic voltammetry (C-V). The result of the C-V measurement is indicated by the solid line in FIG. 5.

The potential was swept from the open-circuit voltage to −0.5 V in the negative direction. The potential was next swept to +2 V in the positive direction. The open-circuit voltage was 2.34 V.

When the potential was swept in the negative direction, almost no negative current, or almost no reduction current, was observed in the range of V>0. As a result, the graph when the potential was swept in the negative direction almost overlaps the horizontal axis in FIG. 5. The current at V=0 when the potential was swept in the negative direction was −5.7 $nA/cm^2$. This is a very small value close to the measurement limit of the device. Thus, the solid electrolyte material according to Example 1 has high reduction resistance.

Evaluation of Ion Conductivity

Figure 6:
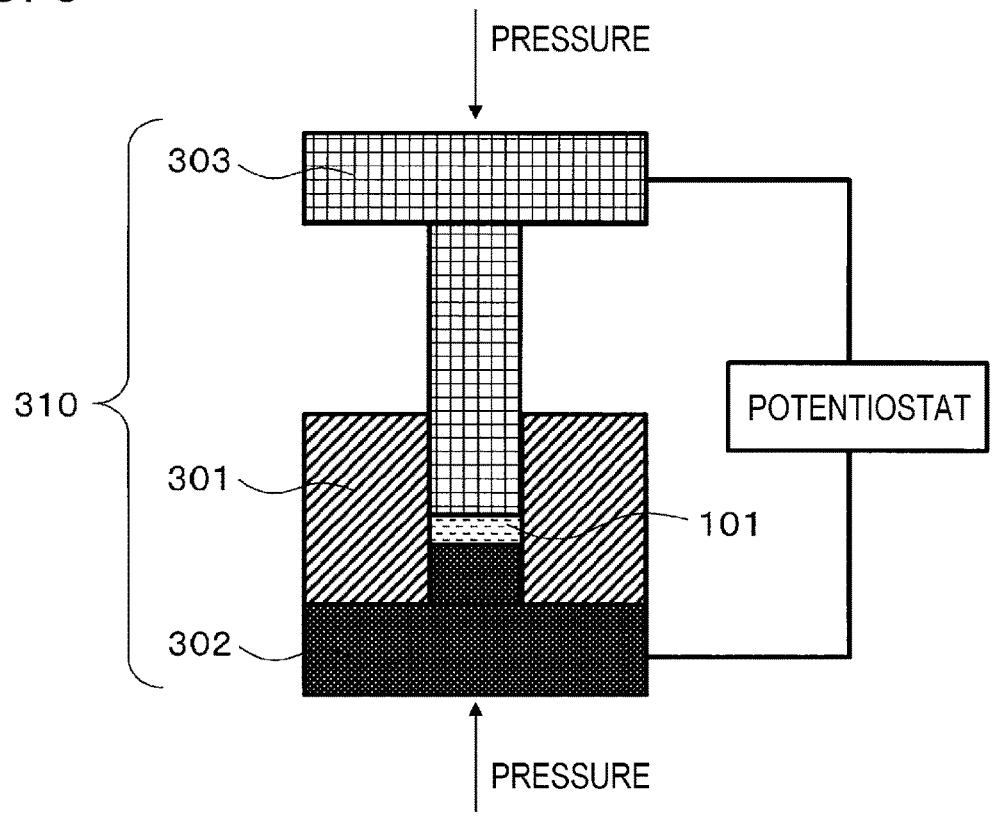
FIG. 6 is a schematic view of a pressure molding die 310 used to evaluate the ion conductivity of a solid electrolyte material.

FIG. 6 is a schematic view of the pressure molding die 310 used to evaluate the ion conductivity of the solid electrolyte material.

The pressure molding die 310 had a die 301, a punch lower part 302, and a punch upper part 303. The die 301 was formed of insulating polycarbonate. The punch upper part 303 and the punch lower part 302 were both formed of stainless steel having electronic conductivity.

The ion conductivity of the solid electrolyte material according to Example 1 was measured by the following method using the pressure molding die 310 shown in FIG. 6.

In an argon atmosphere having a dew point lower than or equal to −30° C., the powder of the solid electrolyte material according to Example 1 (the powder 101 of the solid electrolyte material in FIG. 6) was charged into the pressure molding die 310.

In the pressure molding die 310, a pressure of 400 MPa was applied to the powder of the solid electrolyte material according to Example 1 by using the punch upper part 303.

With the pressure applied, the punch lower part 302 and the punch upper part 303 were connected to a potentiostat (VSP-300 available from Biologic) with a frequency response analyzer. The punch upper part 303 was connected to a working electrode and a potential measuring terminal. The punch lower part 302 was connected to a counter electrode and a reference electrode. The ion conductivity of the solid electrolyte material was measured by the electrochemical impedance measuring method at room temperature.

Figure 7:
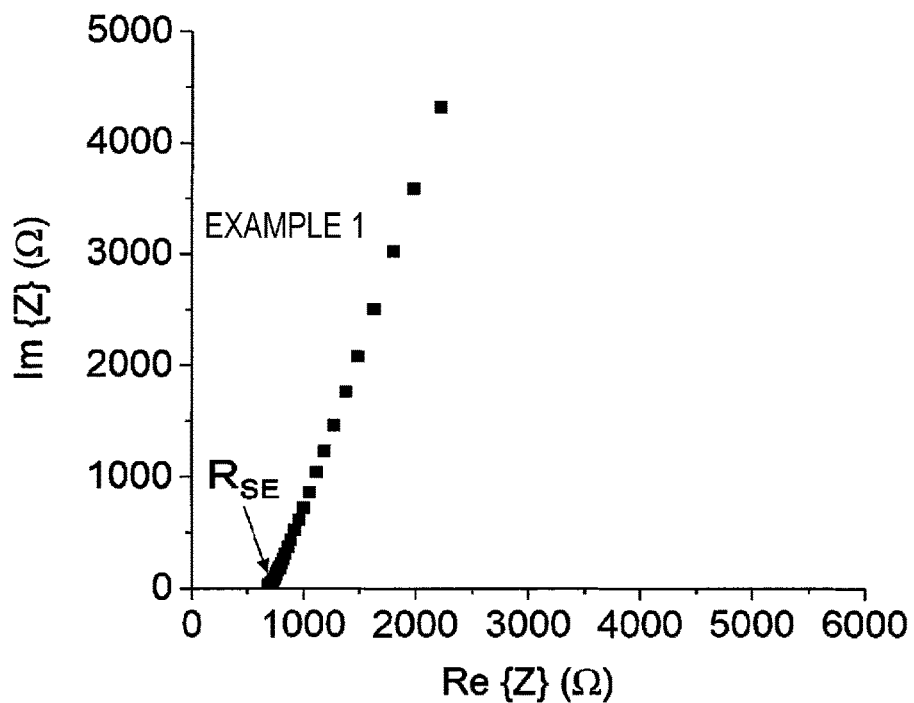
FIG. 7 is a graph showing the Cole-Cole plot of impedance measurement results of the solid electrolyte material according to Example 1.
Figure 8:
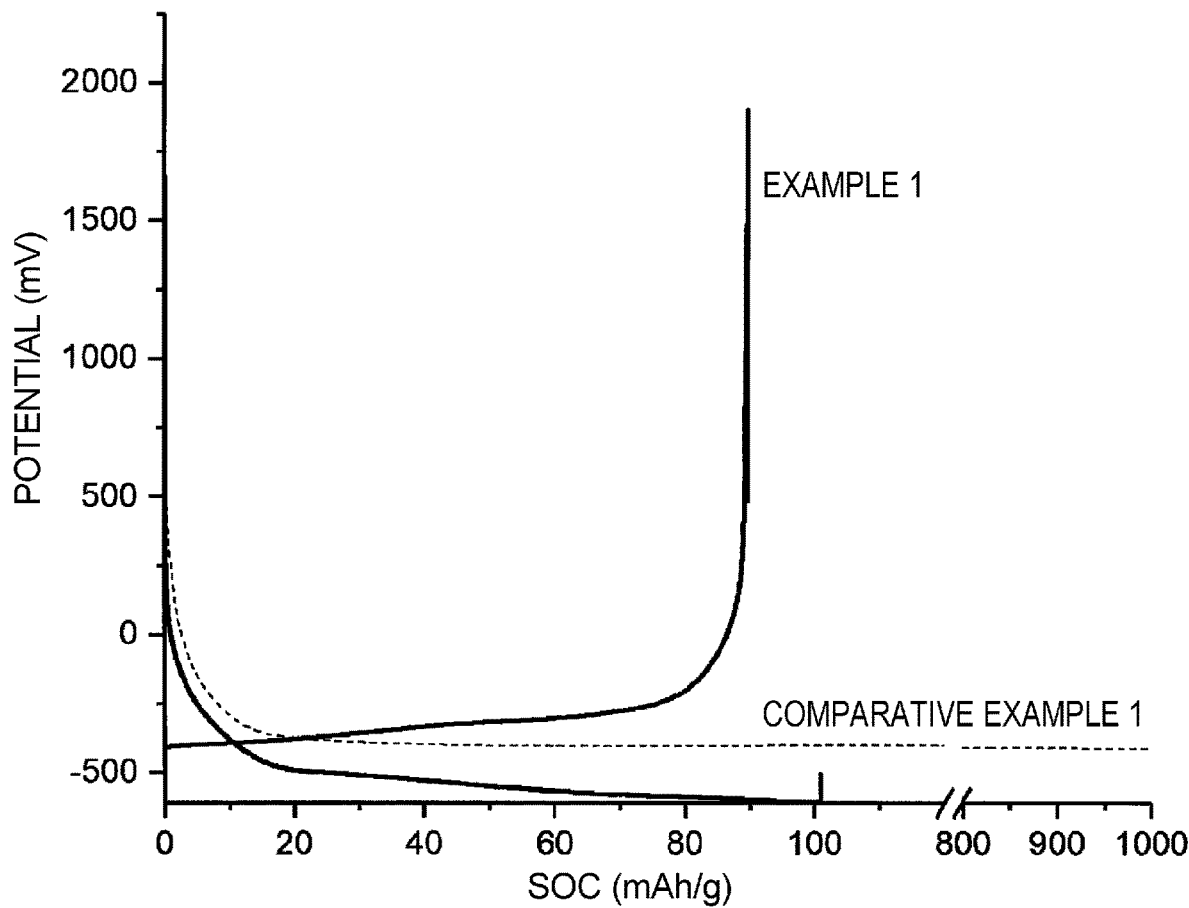
FIG. 8 is a graph showing the initial discharging characteristics of secondary batteries according to Example 1 and Comparative Example 1.

FIG. 7 shows the Cole-Cole plot of the impedance measurement results of the solid electrolyte material according to Example 1.

In FIG. 7, the real value of impedance at the measurement point at which the absolute value of the phase of complex impedance was the smallest was regarded as the resistance of the solid electrolyte material to ion conduction. The real value is indicated by the arrow $R_{SE}$ in FIG. 7. The ion conductivity was calculated by using the resistance on the basis of the following formula (3).

$$\sigma = (R_{SE} \times S/t)^{-1} \quad (3)$$

wherein σ represents the ion conductivity. S represents the area of the solid electrolyte material in contact with the punch upper part 303 (equivalent to the cross sectional area of the cavity in the die 301 in FIG. 6). $R_{SE}$ represents the resistance of the solid electrolyte material in impedance measurement. t represents the thickness of the solid electrolyte material to which the pressure has been applied (equivalent to the thickness of the layer formed of the powder 101 of the solid electrolyte material in FIG. 6). The ion conductivity of the solid electrolyte material according to Example 1 measured at 22° C. was $1.2 \times 10^{-4}$ S/cm.

Production of Secondary Battery

The solid electrolyte material according to Example 1 (81 mg) and graphite (51 mg) were prepared at a volume ratio of 50:50 in a dry argon atmosphere. These materials were mixed in an agate mortar to form a mixture.

In an insulating cylinder having an inner diameter of 9.5 mm, a sulfide solid electrolyte $75Li_2S-25P_2S_5$ (80 mg), the solid electrolyte material according to Example 1 (52 mg), and the above mixture (10.6 mg) were stacked in sequence to form a multilayer body. A pressure of 300 MPa was applied to the multilayer body to form a first electrode and a solid electrolyte layer.

Next, an In metal foil (200 μm thick), a Li metal foil (200 μm thick), and an In metal foil (200 μm thick) were stacked in sequence on the solid electrolyte layer. A pressure of 80 MPa was applied to the resulting multilayer body to form a second electrode. The first electrode was a negative electrode, and the second electrode was a positive electrode.

A current collector formed of stainless steel was attached to each of the first electrode and the second electrode, and a current collector lead was attached to each current collector. Finally, the inside of the insulating cylinder was shut off from the outside atmosphere by using insulated ferrules, whereby the insulating cylinder was sealed. A secondary battery according to Example 1 was produced accordingly.

Charge-Discharge Test

The produced secondary battery was placed in a thermostatic chamber at 25° C.

The battery according to Example 1 was charged to a voltage of −0.62 V at a current density of 53 μA/cm². This current density corresponds to 0.025 C rate.

Next, the battery according to Example 1 was charged to a voltage of 1.9 V at a current density of 53 μA/cm². This current density corresponds to 0.025 C rate.

In charging, lithium ions flow from the second electrode to the first electrode. In discharging, lithium ions flow from the first electrode to the second electrode.

As a result of the charging-discharging test, the secondary battery according to Example 1 had an initial charge/discharge efficiency of 89.1%.

Examples 2 to 35

Production of Solid Electrolyte Material

In Example 2, LiBr, LiI, and $CaBr_2$ were prepared as material powders such that the molar ratio of LiBr:LiI:$CaBr_2$ was 8:10:1.

In Examples 3, 16, and 20, LiBr, LiI, and $CaBr_2$ were prepared as material powders such that the molar ratio of LiBr:LiI:$CaBr_2$ was 3:5:1.

In Example 16, the heat treatment was carried out at 300° C. for 5 hours.

In Example 20, no heat treatment was carried out.

In Example 4, LiBr, LiI, and $CaBr_2$ were prepared as material powders such that the molar ratio of LiBr:LiI:$CaBr_2$ was 3:7:2.

In Examples 5 and 18, LiBr, LiI, and $CaBr_2$ were prepared as material powders such that the molar ratio of LiBr:LiI:$CaBr_2$ was 1:5:2.

In Example 18, no heat treatment was carried out.

In Example 6, LiBr, LiI, and $CaBr_2$ were prepared as material powders such that the molar ratio of LiI:$CaBr_2$ was 6:3.

In Example 7, LiBr, LiI, and $CaBr_2$ were prepared as material powders such that the molar ratio of LiBr:LiI:$CaBr_2$ was 4:2:1.

In Example 8, LiBr, LiI, and $CaBr_2$ were prepared as material powders such that the molar ratio of LiBr:LiI:$CaBr_2$ was 3:3:1.

In Example 9, LiBr, LiI, and $CaBr_2$ were prepared as material powders such that the molar ratio of LiBr:LiI:$CaBr_2$ was 1:5:1.

In Example 10, LiI and $CaBr_2$ were prepared as material powders such that the molar ratio of LiI:$CaBr_2$ was 6:1.

In Examples 11 to 14, LiBr, LiI, and $CaBr_2$ were prepared as material powders such that the molar ratio of LiBr:LiI:$CaBr_2$ was 2:4:1.

In Example 11, the heat treatment was carried out at 400° C. for 30 minutes.

In Example 12, the heat treatment was carried out at 450° C. for 30 minutes.

In Example 13, the heat treatment was carried out at 500° C. for 30 minutes.

In Example 14, the heat treatment was carried out at 500° C. for 5 hours.

In Example 15, LiBr, LiI, and $CaBr_2$ were prepared as material powders such that the molar ratio of LiBr:LiI:$CaBr_2$ was 1:5:2. The heat treatment was carried out at 300° C. for 5 hours.

In Example 17, LiBr, LiI, and $CaBr_2$ were prepared as material powders such that the molar ratio of LiBr:LiI:$CaBr_2$ was 2:4:1. No heat treatment was carried out.

In Example 19, LiBr, LiI, and $CaI_2$ were prepared as material powders such that the molar ratio of $LiBr:LiI:CaI_2$ was 5:2:1.5. No heat treatment was carried out.

In Example 21, LiBr, $CaBr_2$, and $CaI_2$ were prepared as material powders such that the molar ratio of $LiBr:CaBr_2:CaI_2$ was 6:1:1. No heat treatment was carried out.

In Example 22, LiBr, $CaBr_2$, and $CaI_2$ were prepared as material powders such that the molar ratio of $LiBr:CaBr_2:CaI_2$ was 6:0.5:1.5. No heat treatment was carried out.

In Example 23, LiBr and $CaI_2$ were prepared as material powders such that the molar ratio of $LiBr:CaI_2$ was 3:1. No heat treatment was carried out.

In Example 24, LiI and $CaBr_2$ were prepared as material powders such that the molar ratio of $LiI:CaBr_2$ was 3:1. No heat treatment was carried out.

In Example 25, LiI, $CaBr_2$, and $CaI_2$ were prepared as material powders such that the molar ratio of $LiI:CaBr_2:CaI_2$ was 6:1:1. No heat treatment was carried out.

In Example 26, LiBr, LiI, and $CaBr_2$ were prepared as material powders such that the molar ratio of $LiBr:LiI:CaBr_2$ was 5:3:1. No heat treatment was carried out.

In Example 27, LiBr, LiI, and $CaBr_2$ were prepared as material powders such that the molar ratio of $LiBr:LiI:CaBr_2$ was 1:7:1. No heat treatment was carried out.

In Example 28, LiBr, LiI, and $CaBr_2$ were prepared as material powders such that the molar ratio of $LiBr:LiI:CaBr_2$ was 1:3:2. No heat treatment was carried out.

In Example 29, LiBr, LiI, and $CaBr_2$ were prepared as material powders such that the molar ratio of $LiBr:LiI:CaBr_2$ was 1:4:2. No heat treatment was carried out.

In Example 30, LiCl, LiBr, LiI, and $CaBr_2$ were prepared as material powders such that the molar ratio of $LiCl:LiBr:LiI:CaBr_2$ was 0.5:1.5:4:1. No heat treatment was carried out.

In Example 31, LiF, LiBr, LiI, and $CaBr_2$ were prepared as material powders such that the molar ratio of $LiF:LiBr:LiI:CaBr_2$ was 0.5:1.5:4:1. No heat treatment was carried out.

In Example 32, LiBr, LiI, $CaBr_2$, and $MgBr_2$ were prepared as material powders such that the molar ratio of $LiBr:LiI:CaBr_2:MgBr_2$ was 2:4:0.9:0.1.

In Example 33, LiBr, LiI, $CaBr_2$, and $SrBr_2$ were prepared as material powders such that the molar ratio of $LiBr:LiI:CaBr_2:SrBr_2$ was 2:4:0.9:0.1.

In Example 34, LiI and $CaI_2$ were prepared as material powders such that the molar ratio of $LiI:CaI_2$ was 6:1. No heat treatment was carried out.

In Example 35, LiBr and $CaBr_2$ were prepared as material powders such that the molar ratio of $LiBr:CaBr_2$ was 3:1. No heat treatment was carried out.

Otherwise, the same experiments as Example 1 were carried out. The solid electrolyte materials according to Examples 2 to 35 were produced accordingly.

Analysis of Crystal Structure

The X-ray diffraction patterns of the solid electrolyte materials according to Examples 2 to 29, 34, and 35 were measured in the same manner as in Example 1. The results of the measurement are shown in FIG. 2. In all Examples the X-ray diffraction patterns of which were measured, the peaks were present in the range of diffraction angles 2θ greater than or equal to 25° and less than or equal to 29°, the range of diffraction angles 2θ greater than or equal to 29° and less than or equal to 33°, and the range of diffraction angles 2θ greater than or equal to 42° and less than or equal to 48°. These peak angles coincide with peak angles of a rock salt structure having a crystal structure belonging to space group Fm-3m.

As in Example 1, the horizontal axis of the X-ray diffraction pattern shown in FIG. 2 is converted. The peaks present in the range of diffraction angles 2θ greater than or equal to 25° and less than or equal to 29° in FIG. 2 are peaks corresponding to $q_0$ in the first conversion pattern. The second conversion patterns of the solid electrolyte materials according to Examples 2 to 29, 34, and 35 are shown in FIG. 3. In all of these Examples, the peaks were present in the range of values of $q/q_0$ greater than or equal to 1.13 and less than or equal to 1.18 and the range of values of $q/q_0$ greater than or equal to 1.60 and less than or equal to 1.66. These peak positions coincide with peak positions of a rock salt structure having a crystal structure belonging to space group Fm-3m.

Evaluation of Reduction Resistance

The reduction resistance of the solid electrolyte materials according to Examples 2 to 35 was evaluated in the same manner as in Example 1.

In all of Examples 2 to 35, the current at V=0 when the potential was swept in the negative direction was less than or equal to 10 $nA/cm^2$ close to the measurement limit as in Example 1. Thus, almost no reduction current was observed, which indicates that the solid electrolyte materials according to Examples 2 to 35 had high reduction resistance.

Evaluation of Ion Conductivity

The ion conductivity of the solid electrolyte materials according to Examples 2 to 35 was measured in the same manner as in Example 1. The results of the measurement are shown in Table 1.

Charge-Discharge Test

Secondary batteries were produced by using the solid electrolyte materials according to Examples 2 to 35 in the same manner as in Example 1. The secondary batteries according to Examples 2 to 35 had good charge/discharge characteristics, like the secondary battery according to Example 1.

Comparative Example 1

In a dry argon atmosphere, LiBr and $YBr_3$ were prepared as material powders such that the molar ratio of $LiBr:YBr_3$ was 3:1. These powders were ground in a mortar to form a mixture. The mixture was milled in a planetary ball mill at 600 rpm for 12 hours. A powder of a solid electrolyte material according to Comparative Example 1 was produced accordingly. The solid electrolyte material according to Comparative Example 1 had a composition represented by $Li_3YBr_6$.

The reduction resistance of the solid electrolyte material according to Comparative Example 1 was measured by the C-V method as in Example 1. The result of the C-V measurement is indicated by the solid line in FIG. 5.

The potential was swept from the open-circuit voltage to −0.2 V in the negative direction. The potential was next swept to +2.0 V in the positive direction. The open-circuit voltage was 1.89 V.

The current at V=0 when the potential was swept in the negative direction was −0.389 $mA/cm^2$. Thus, a large reduction current was observed, which indicates that the solid electrolyte material according to Comparative Example 1 was subjected to reduction decomposition.

A secondary battery according to Comparative Example 1 was produced in the same manner as Example 1. The secondary battery according to Comparative Example 1 was charged, but the potential failed to decrease to −0.4 V or less and failed to reach −0.62 V, an end-of-charge voltage, even when the capacity far exceeded the theoretical capacity of graphite. This may be because the solid electrolyte material according to Comparative Example 1 was subjected to reduction decomposition at −0.4 V and the reduction current continued to flow.

The compositions and evaluation results of the solid electrolyte materials according to Examples 1 to 35 and Comparative Example 1 are shown in Table 1.

23 and 24, the solid electrolyte materials have higher ion conductivity when the above ratio is greater than or equal to 2/3 and less than or equal to 3/2.

Being free of sulfur, the solid electrolyte materials according to Examples 1 to 35 produce no hydrogen sulfide.

As described above, the solid electrolyte material according to the present disclosure produces no hydrogen sulfide,

TABLE 1

| | Composition Formula | Heat Treatment Conditions | Reduction Current ($\mu A/cm^2$) | Conductivity (S/cm) | b | b/(a + b) | 1 − (x + y + z) |
|---|---|---|---|---|---|---|---|
| Example 1 | $Li_6CaBr_4I_4$ | 500° C. 1 hr | <0.01 | 1.23E−04 | 1 | 0.14 | 0.5 |
| Example 2 | $Li_{18}CaBr_{10}I_{10}$ | 500° C. 1 hr | <0.01 | 1.55E−05 | 1 | 0.05 | 0.5 |
| Example 3 | $Li_8CaBr_5I_5$ | 500° C. 1 hr | <0.01 | 1.23E−04 | 1 | 0.11 | 0.5 |
| Example 4 | $Li_{10}Ca_2Br_7I_7$ | 500° C. 1 hr | <0.01 | 8.75E−05 | 2 | 0.17 | 0.5 |
| Example 5 | $Li_6Ca_2Br_5I_5$ | 500° C. 1 hr | <0.01 | 8.71E−05 | 2 | 0.25 | 0.5 |
| Example 6 | $Li_6Ca_3Br_6I_6$ | 500° C. 1 hr | <0.01 | 7.17E−05 | 3 | 0.33 | 0.5 |
| Example 7 | $Li_6CaBr_6I_2$ | 500° C. 1 hr | <0.01 | 1.24E−05 | 1 | 0.14 | 0.25 |
| Example 8 | $Li_6CaBr_5I_3$ | 500° C. 1 hr | <0.01 | 1.01E−05 | 1 | 0.14 | 0.375 |
| Example 9 | $Li_6CaBr_3I_5$ | 500° C. 1 hr | <0.01 | 8.52E−05 | 1 | 0.14 | 0.625 |
| Example 10 | $Li_6CaBr_2I_6$ | 500° C. 1 hr | <0.01 | 1.81E−06 | 1 | 0.14 | 0.75 |
| Example 11 | $Li_6CaBr_4I_4$ | 400° C. 30 min | <0.01 | 9.30E−05 | 1 | 0.14 | 0.5 |
| Example 12 | $Li_6CaBr_4I_4$ | 450° C. 30 min | <0.01 | 9.71E−05 | 1 | 0.14 | 0.5 |
| Example 13 | $Li_6CaBr_4I_4$ | 500° C. 30 min | <0.01 | 1.01E−04 | 1 | 0.14 | 0.5 |
| Example 14 | $Li_6CaBr_4I_4$ | 500° C. 5 hr | <0.01 | 9.26E−05 | 1 | 0.14 | 0.5 |
| Example 15 | $Li_6Ca_2Br_5I_5$ | 300° C. 5 hr | <0.01 | 2.07E−05 | 2 | 0.25 | 0.5 |
| Example 16 | $Li_8CaBr_5I_5$ | 300° C. 5 hr | <0.01 | 1.02E−05 | 1 | 0.11 | 0.5 |
| Example 17 | $Li_6CaBr_4I_4$ | no heat treatment | <0.01 | 2.70E−05 | 1 | 0.14 | 0.5 |
| Example 18 | $Li_6Ca_2Br_5I_5$ | no heat treatment | <0.01 | 2.20E−05 | 2 | 0.25 | 0.5 |
| Example 19 | $Li_7Ca_{1.5}Br_5I_5$ | no heat treatment | <0.01 | 2.65E−05 | 1.5 | 0.18 | 0.5 |
| Example 20 | $Li_8CaBr_5I_5$ | no heat treatment | <0.01 | 2.66E−05 | 1 | 0.11 | 0.5 |
| Example 21 | $Li_6Ca_2Br_8I_2$ | no heat treatment | <0.01 | 2.96E−06 | 2 | 0.25 | 0.2 |
| Example 22 | $Li_6Ca_2Br_7I_3$ | no heat treatment | <0.01 | 1.48E−05 | 2 | 0.25 | 0.3 |
| Example 23 | $Li_6Ca_2Br_6I_4$ | no heat treatment | <0.01 | 2.63E−05 | 2 | 0.25 | 0.4 |
| Example 24 | $Li_6Ca_2Br_4I_6$ | no heat treatment | <0.01 | 3.14E−05 | 2 | 0.25 | 0.6 |
| Example 25 | $Li_6Ca_2Br_2I_8$ | no heat treatment | <0.01 | 1.54E−05 | 2 | 0.25 | 0.8 |
| Example 26 | $Li_8CaBr_7I_3$ | no heat treatment | <0.01 | 7.26E−06 | 1 | 0.11 | 0.3 |
| Example 27 | $Li_8CaBr_3I_7$ | no heat treatment | <0.01 | 3.07E−05 | 1 | 0.11 | 0.7 |
| Example 28 | $Li_4Ca_2Br_5I_3$ | no heat treatment | <0.01 | 1.25E−05 | 2 | 0.33 | 0.375 |
| Example 29 | $Li_5Ca_2Br_5I_4$ | no heat treatment | <0.01 | 3.09E−05 | 2 | 0.29 | 0.44 |
| Example 30 | $Li_6CaCl_{0.5}Br_{3.5}I_4$ | no heat treatment | <0.01 | 2.05E−06 | 1 | 0.14 | 0.5 |
| Example 31 | $Li_6CaF_{0.5}Br_{3.5}I_4$ | no heat treatment | <0.01 | 1.30E−07 | 1 | 0.14 | 0.5 |
| Example 32 | $Li_6Ca_{0.9}Mg_{0.1}Br_4I_4$ | 500° C. 1 hr | <0.01 | 5.00E−05 | 1 | 0.14 | 0.5 |
| Example 33 | $Li_6Ca_{0.9}Sr_{0.1}Br_4I_4$ | 500° C. 1 hr | <0.01 | 2.00E−05 | 1 | 0.14 | 0.5 |
| Example 34 | $Li_6CaI_8$ | no heat treatment | <0.01 | 5.64E−06 | 1 | 0.14 | 1 |
| Example 35 | $Li_6Ca_2Br_{10}$ | no heat treatment | <0.01 | 5.74E−08 | 2 | 0.25 | 0 |
| Comparative Example 1 | $Li_3YBr_6$ | no heat treatment | 389 | — | — | — | — |

Discussion

As is apparent from Table 1, almost no reduction current was observed in the C-V measurement of the solid electrolyte materials according to Examples 1 to 35. In other words, the solid electrolyte materials according to Examples 1 to 35 have high reduction resistance. In contrast, a large reduction current was observed in the C-V measurement of the solid electrolyte material according to Comparative Example 1.

As is apparent from Table 1, the solid electrolyte materials have high ion conductivity as long as the value of b/(a+b) is greater than or equal to 0.05 and less than or equal to 0.33.

As is apparent from comparison of Example 35 with Examples 1 to 34, the solid electrolyte materials have higher ion conductivity when the value of 1−(x+y+z) is greater than 0, that is, the solid electrolyte materials contain I (i.e., iodine).

As is apparent from comparison of Example 21 with Examples 22 to 25, the solid electrolyte materials have high ion conductivity when X represents Br and I and the ratio of the molar fraction of I to the molar fraction of Br is greater than or equal to 3/7 and less than or equal to 4. As is apparent from comparison of Examples 21, 22, and 25 with Examples has higher reduction resistance, and is suitable for providing batteries that can be charged and discharged well.

The solid electrolyte material according to the present disclosure may be used in batteries (e.g., all-solid-state lithium-ion secondary batteries).

What is claimed is:

1. A solid electrolyte material comprising a crystal phase represented by composition formula (2) below:

$$Li_a(Ca_{1-m}M_m)_b(F_xCl_yBr_zI_{1-(x+y+z)})_c \quad (2)$$

wherein M is at least one element selected from the group consisting of Mg, Sr, and Ba, and
the following formulas are satisfied:
a>0,
b>0,
c>0,
0≤m<1, and
0.25≤1−(x+y+z)≤0.8.

2. The solid electrolyte material according to claim 1, wherein, in an X-ray diffraction pattern determined by X-ray diffraction analysis using Cu—Kα radiation, a peak is present in each of a range of diffraction angles 2θ greater than or equal to 25° and less than or equal to 29°, a range of diffraction angles 2θ greater than or equal to 29° and less than or equal to 33°, and a range of diffraction angles 2θ greater than or equal to 42° and less than or equal to 48°.

3. The solid electrolyte material according to claim 1, wherein, when a value of q of a peak present in a range of values of q greater than or equal to 0.176 nm$^{-1}$ and less than or equal to 0.204 nm$^{-1}$ is defined as $q_0$ in a first conversion pattern obtained by converting a horizontal axis of the X-ray diffraction pattern from diffraction angle 2θ to q, where $$q=4\pi \sin \theta/\lambda, \text{ and}$$

λ represents a wavelength of an X-ray used in the X-ray diffraction analysis, in a second conversion pattern obtained by converting the horizontal axis of the X-ray diffraction pattern from diffraction angle 2θ to $q/q_0$, a peak is present in each of a range of values of $q/q_0$ greater than or equal to 1.13 and less than or equal to 1.18 and a range of values of $q/q_0$ greater than or equal to 1.60 and less than or equal to 1.66.

4. The solid electrolyte material according to claim 1, wherein the following formula is satisfied: c=a+2b.

5. The solid electrolyte material according to claim 1, wherein the following formula is satisfied: 0.05≤a/(a+b)≤0.333.

6. The solid electrolyte material according to claim 1, wherein the following formula is satisfied: 0≤m≤0.1.

7. A battery comprising:
a positive electrode;
a negative electrode; and
an electrolyte layer disposed between the positive electrode and the negative electrode,
wherein at least one selected from the group consisting of the positive electrode, the negative electrode, and the electrolyte layer contains the solid electrolyte material according to claim 1.

8. The battery according to claim 7, wherein the negative electrode contains the solid electrolyte material.

9. The battery according to claim 7, wherein the negative electrode contains graphite.

10. A solid electrolyte material comprising a crystal phase represented by composition formula (1) below:

wherein M is at least one element selected from the group consisting of Mg, Sr, and Ba, X is at least one element selected from the group consisting of F, Cl, Br, and I, and
the following formulas are satisfied:
a>0,
b>0,
c>0,
0≤m<1, and
0.05≤a/(a+b)≤0.333.

11. The solid electrolyte material according to claim 10, wherein, in an X-ray diffraction pattern determined by X-ray diffraction analysis using Cu—Kα radiation, a peak is present in each of a range of diffraction angles 2θ greater than or equal to 25° and less than or equal to 29°, a range of diffraction angles 2θ greater than or equal to 29° and less than or equal to 33°, and a range of diffraction angles 2θ greater than or equal to 42° and less than or equal to 48°.

12. The solid electrolyte material according to claim 10, wherein, when a value of q of a peak present in a range of values of q greater than or equal to 0.176 nm$^{-1}$ and less than or equal to 0.204 nm$^{-1}$ is defined as $q_0$ in a first conversion pattern obtained by converting a horizontal axis of the X-ray diffraction pattern from diffraction angle 2θ to q, where $$q=4\pi \sin \theta/\lambda, \text{ and}$$

λ represents a wavelength of an X-ray used in the X-ray diffraction analysis, in a second conversion pattern obtained by converting the horizontal axis of the X-ray diffraction pattern from diffraction angle 2θ to $q/q_0$, a peak is present in each of a range of values of $q/q_0$ greater than or equal to 1.13 and less than or equal to 1.18 and a range of values of $q/q_0$ greater than or equal to 1.60 and less than or equal to 1.66.

13. The solid electrolyte material according to claim 10, wherein the following formula is satisfied: c=a+2b.

14. The solid electrolyte material according to claim 10, wherein the following formula is satisfied: 0≤m≤0.1.

15. The solid electrolyte material according to claim 10, wherein the solid electrolyte material is represented by composition formula (2) below:

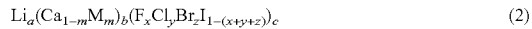

wherein the following formula is satisfied: 0.25≤1−(x+y+z)≤0.8.

16. A battery comprising:
a positive electrode;
a negative electrode; and
an electrolyte layer disposed between the positive electrode and the negative electrode,
wherein at least one selected from the group consisting of the positive electrode, the negative electrode, and the electrolyte layer contains the solid electrolyte material according to claim 10.

17. The battery according to claim 16, wherein the negative electrode contains the solid electrolyte material.

18. The battery according to claim 16, wherein the negative electrode contains graphite.

19. A battery comprising:
a positive electrode;
a negative electrode; and
an electrolyte layer disposed between the positive electrode and the negative electrode,
wherein the negative electrode contains a solid electrolyte material comprising a crystal phase represented by composition formula (1) below:

wherein M is at least one element selected from the group consisting of Mg, Sr, and Ba, X is at least one element selected from the group consisting of F, Cl, Br, and I, and
the following formulas are satisfied:
a>0,
b>0,
c>0, and
0≤m<1.

* * * * *